United States Patent
Brunner et al.

(10) Patent No.: US 7,078,658 B2
(45) Date of Patent: Jul. 18, 2006

(54) HEATER MAT MADE OF ELECTRICALLY-CONDUCTIVE FIBERS

(75) Inventors: Daniel Brunner, Soisy-Sous-Montmorency (FR); André Amari, Marly la Ville (FR)

(73) Assignee: Eurocopter, Marignane (FR)

( * ) Notice: Subject to any disclaimer, the term of this patent is extended or adjusted under 35 U.S.C. 154(b) by 0 days.

(21) Appl. No.: 11/055,409

(22) Filed: Feb. 11, 2005

(65) Prior Publication Data

US 2005/0189345 A1 Sep. 1, 2005

(30) Foreign Application Priority Data

Feb. 11, 2004 (FR) .................... 04 01322

(51) Int. Cl.
*H05B 3/54* (2006.01)
(52) U.S. Cl. .................. 219/529; 219/201; 219/211; 219/520; 219/535; 219/542; 219/548; 219/552; 244/134 D; 244/134 R; 244/134 F
(58) Field of Classification Search ............... 219/201, 219/202, 211, 212, 520, 528, 529, 535, 542, 219/548, 545, 552; 244/134 D, 134 R, 134 F
See application file for complete search history.

(56) References Cited

U.S. PATENT DOCUMENTS 5,947,418 A 9/1999 Bessiere et al.
6,229,123 B1 * 5/2001 Kochman et al. ........... 219/549

FOREIGN PATENT DOCUMENTS

| FR | 935 233 | 6/1948 |
|---|---|---|
| FR | 1 349 752 | 1/1964 |
| FR | 2 578 377 | 9/1986 |
| FR | 2 756 253 | 5/1998 |
| WO | WO 95/15670 | 6/1995 |
| WO | WO 99/35888 | 7/1999 |
| WO | WO 03/007659 | 1/2003 |

* cited by examiner

Primary Examiner—Shawntina Fuqua
(74) Attorney, Agent, or Firm—Young & Thompson

(57) ABSTRACT

A heater mat for using the Joule effect to heat an aerodynamic surface. The heater mat is provided with a resistor element including at least two substantially parallel segments of electrically-conductive fibers disposed on the aerodynamic surface. The segments come from a single strip of electrically-conductive fibers, with two adjacent segments being obtained by folding a portion of the single strip at least twice.

10 Claims, 1 Drawing Sheet

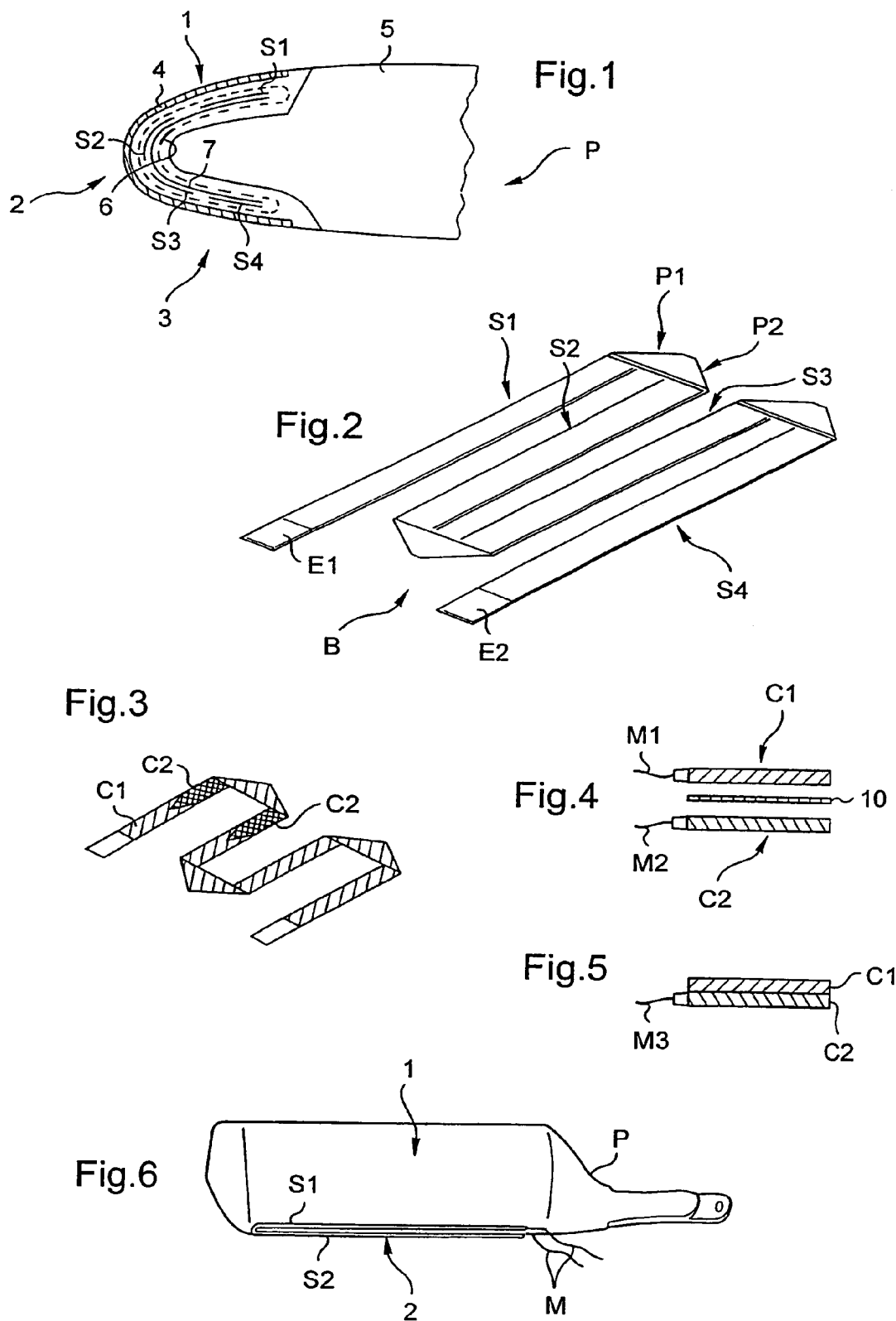

HEATER MAT MADE OF ELECTRICALLY-CONDUCTIVE FIBERS

The present invention relates to a heater mat for heating aerodynamic surfaces of an aircraft. More particularly, the aerodynamic surfaces in question are those having an aerodynamic shape that must not be disturbed by ice forming thereon, such as, in particular: the blades of the main rotor or the tail rotor of a rotorcraft, or the wings of an airplane.

More generally, the invention may also advantageously be used for de-icing and/or anti-icing of structures in which weight overload due to ice could severely degrade mechanical performance, or efficiency, such as the blades of wind turbines, the air inlets of engines, Fenestron® type ducted rotors (walls for guiding the air feed stream, blades), and even the fuselages of aircraft.

BACKGROUND OF THE INVENTION

The problem of aerodynamic surfaces icing is well known in the aviation industry. The term "icing" is used to designate the more or less rapid build-up of a deposit of ice on certain portions of an aircraft (leading edges of blades, propellers, wings, tail stabilizers and fins, windshields, etc.). This build-up of ice is due to the fact that in flight the surface encounters super-cooled droplets of water in the atmosphere. This super-cooled state is a state of highly unstable equilibrium that can be disrupted if some very small quantity of energy is delivered to the water droplet, e.g. in the form of a mechanical impact. The water changes state and switches to the solid state. Thus, a wing or a blade passing through a zone of super-cooled rain gives all of the water droplets sufficient energy for them to change to the solid state. The aerodynamic structure then becomes covered in ice very quickly. This deposit of ice increases the weight of the aircraft, sometimes to a considerable extent, and interferes with the air flow by changing the shape of the aerodynamic surface, thereby greatly degrading its performance.

The drag coefficient CD and the lift coefficient CL of an airfoil are directly proportional to the shape of an aerodynamic surface and to its angle of incidence. The lift capacity of the aerodynamic surface is characterized by its efficiency, i.e. the fineness ratio which is the ratio of lift over drag. The efficiency of an airfoil increases with increasing ability to generate lift relative to drag. The formation of hard ice, soft ice, or frost leads to weight overload, increases drag CD of the aerodynamic surface, and reduces its lift CL. The operational performances of an aircraft are those affected directly by the phenomenon of icing.

The problem is often handled by fitting the aerodynamic surface with a Joule effect heater device. In general, a distinction is drawn between de-icers which are resistor elements that dissipate heat and that are powered intermittently in order to get rid of the ice that forms regularly, and anti-icers which are resistor elements that are powered continuously in order to prevent ice forming. Anti-icers are activated in preventative manner prior to entering icing conditions, whereas de-icers are used mainly in curative manner, once ice has already formed.

Document FR 2 578 377 discloses a Joule effect heater device made up of carbon fibers embedded in an organic matrix, generally of the epoxy type. Those composite resistor elements of conductive carbon fibers form tapes which preferably extend in the vicinity of the leading edge of an aerodynamic surface and in parallel therewith. In order to obtain Joule effect heating power that varies along the leading edge, a plurality of resistive layers are superposed.

Document FR 2 756 253 discloses a Joule effect heater device made of composite materials for the blades of a rotorcraft, the device comprising a plurality of tapes provided with at least one resistive layer of constant width and at least one resistive layer of continuously varying width. That configuration makes it possible to optimize variation in the electrical resistance of the device, in particular along a leading edge, so as to obtain the required heating power per unit area as specified by heat engineers during blade design.

Nevertheless, cutting out, laying, and assembling such resistive layers made of electrically-conductive carbon fibers impregnated in a thermosetting organic matrix raise several manufacturing problems because of the complexity involved. Each resistive layer is made of a set of longitudinal tapes. Two adjacent longitudinal tapes are interconnected by a transverse tape disposed perpendicularly at one of the ends of the two longitudinal tapes. As a result, electrical conduction between two adjacent longitudinal tapes is provided by a transverse tape.

That complex architecture requires a large amount of cutting-out to be performed which is economically penalizing.

Furthermore, the orientation of the longitudinal and transverse tapes must be accurately laid out, so the time required for manual draping of all the pieces turns out to be long.

Furthermore, the surface quality of the longitudinal and transverse tapes in a given resistive layer (contact area, local orientation of fibers), which is essential for proper operation of the resistive array as a whole, is not always effectively guaranteed. It can happen that dielectric plastic separators are forgotten during assembly resulting in the part being rejected. Similarly, transverse tapes sometimes slide from the manufacturing mold while the device is being shaped or while it is polymerizing.

OBJECTS AND SUMMARY OF THE INVENTION

An object of the present invention is to provide a heater mat for aerodynamic surfaces, which mat is made of a resistor element that enables the above-mentioned limitations to be overcome.

The invention provides a heater mat for using the Joule effect to heat an aerodynamic surface of an aircraft, the mat being provided with a resistor element comprising at least two substantially parallel segments of electrically-conductive fibers disposed on said aerodynamic surface. The invention is remarkable in that said substantially parallel segments come from a single strip of electrically-conductive fibers, with two adjacent substantially parallel segments being obtained by folding a portion of said single strip at least twice.

Preferably, the electrically-conductive fibers are of the mineral type and are constituted by composite fibers of carbon coated in resin as so to form the single strip.

The resistor element of the heater mat is thus provided with a single strip of electrically-conductive fibers making it certain that there is continuity of the electrical connection along the various substantially parallel segments of the single strip.

In addition, this configuration also makes it possible to obtain better control over the local orientation of the electrically-conductive fibers, thereby avoiding the implementation difficulties that are to be found in devices prior to the invention.

The resistor element is also much simpler to shape. In the invention, it suffices merely to fold the single strip in order to obtain the desired resistor element. The time required for manufacturing the heater mat under such conditions is much shorter than that needed for cutting out and assembling together a plurality of transverse and longitudinal tapes.

The single strip may be of constant section or its section may vary along the leading edge. The section can be made to vary by varying the width of the single strip. Advantageously, a first portion of the single strip of electrically-conductive fibers is of constant width, and a second portion is of varying width. The width of the strip preferably varies in continuous manner.

In order to optimize the electrical resistance of the heater mat, the resistor element may comprise at least two superposed resistive layers. Each resistive layer is made up of a single strip of electrically-conductive fibers, the strip being folded using the above-mentioned technique.

In a first variant of the invention, two superposed and adjacent resistive layers are made electrically-independent by placing a dielectric separator between the two resistive layers, which separator is advantageously constituted by a ply of glass fabric. Under such conditions, each of the resistive layers is powered electrically independently from the other.

In contrast, in a second variant of the invention, two superposed and adjacent resistive layers are in contact with each other and thus form a single resistive array. A single common electrical power supply thus suffices in this case.

A particular application of the invention lies in the field of rotorcraft blades where aerodynamic performance is essential for stability in flight and where the mass of the components is determining. The substantially parallel segments of electrically-conductive fibers are then disposed along the span of the aerodynamic surface, parallel to its leading edge, with the aerodynamic surface in this case being a blade. The number of resistive layers to be stacked and the width of the single strip constituting a given resistive layer are determined as a function of thermal specifications specified by heat and aerodynamic engineers when designing the blade. These parameters depend in particular on the speed of rotation of the rotor, the number of blades, and the length and the cord of the blades.

BRIEF DESCRIPTION OF THE DRAWINGS

Other features and advantages of the present invention appear from the following description of embodiments given by way of illustration with reference to the accompanying figures, in which:

FIG. 1 is a cross-section through an aerodynamic surface fitted with a heater mat of the invention;

FIG. 2 is a diagrammatic view of a single layer resistor element;

FIG. 3 is a diagrammatic view of a multilayer resistive layer;

FIG. 4 is a section through a first variant of a multilayer resistor element;

FIG. 5 is a section through a second variant of a multilayer resistor element; and FIG. 6 shows a heater mat of the invention in place on a rotorcraft blade.

MORE DETAILED DESCRIPTION

FIG. 1 is a cross-section through an aerodynamic surface of an aircraft, for example a blade P made of composite material for a helicopter tail rotor, and fitted with a heater mat 6 of the invention.

The blade P is made of composite materials based on carbon fibers for its covering and on glass fibers for its spar, the vicinity of its leading edge 2 being covered by shielding 4 (e.g. made of metal) to provide protection against impacts and erosion due to rain or sand. The heater mat 6 is disposed between the core 5 of the blade P and the shielding 4. In addition, it is provided with a composite substrate 7 having a resistor element of electrically-conductive fibers stuck thereto, the element comprising four substantially parallel segments S1, S2, S3, and S4. The segment S1 of the resistor element is on the suction side 1 of the composite blade P, the segments S2 and S3 are on the leading edge 2, and the segment S4 is on the pressure side 3.

FIG. 2 shows a resistor element in a first embodiment. This resistor element is said to be a "single layer" element insofar as it has only one strip B of electrically-conductive fibers, e.g. carbon fibers.

This single strip B is made up of four substantially parallel segments S1, S2, S3, and S4. Adjacent segments S1 and S2 come from a portion of the single strip B, this portion being folded in two zones P1 and P2. Similarly, two folds are made between the adjacent segments S2 and S3, and two more folds between the adjacent segments S3 and S4. Depending on the desired configuration, a larger number of folds could be made between two adjacent segments.

The ends E1 and E2 of the single strip B enable the strip to be connected to the electrical power supply means of the aircraft. By being powered electrically in continuous manner during a flight by the electrical power means of the aircraft, the resistor element acts in anti-icing mode. The aerodynamic surface is heated by the Joule effect, thereby preventing any ice forming on said surface. In contrast, by powering it electrically in intermittent manner, the resistor element operates in a de-icing mode so as to remove ice that is present on the aerodynamic surface.

FIG. 3 shows a resistor element in a second embodiment. This heater mat is said to be "multilayer" insofar as it comprises two superposed resistive layers C1 and C2.

The first and second resistive layers C1 and C2 are each constituted by a single strip of electrically-conductive fibers, each single strip being folded on the same principles as described above. The single strip of the first resistive layer C1 is of constant width. One portion of the single strip constituting the second resistive layer C2 is of constant width, whereas its other two portions are of continuously varying width.

In a first variant of the second embodiment, shown in FIG. 4, the first and second resistive layers C1 and C2 are superposed and adjacent. In addition, they are separated by a dielectric layer 10. Advantageously, the dielectric layer is made up of a glass fabric impregnated in the same thermosetting impregnation matrix as the matrix impregnating the electrically-conductive fibers of the first and second resistive layers C1 and C2. Under such conditions, each of the resistive layers C1 and C2 is electrically independent, and consequently their ends are connected respectively to their own power supply means M1 and M2.

In a second variant of the second embodiment, shown in FIG. 5, the first and second superposed and adjacent resistive layers C1 and C2 are not separated by a dielectric layer, but are electrically in contact with each other. Under such circumstances, only one electrical power supply means M3 is needed, and the resistive array formed in this way is subjected to overall temperature control.

In a third variant of the second embodiment, not shown in the figure, the multilayer heater mat has more than two resistive layers that are superposed and adjacent, and separated by at least one dielectric layer. In addition, at least two superposed and adjacent resistive layers are electrically in contact with each other.

Whether the single layer or multilayer embodiment is used depends on the thermal power required per unit area to de-ice or to prevent icing of the aerodynamic surface concerned. Similarly, the width of the single strip constituting the resistive layer, whether it is constant or varying, is also determined as a function of the required heat power per unit area.

FIG. 6 shows a heater mat of the invention arranged in a blade P of composite material for a rotorcraft. The segment S1 of the heater mat is disposed on the suction side 1 of the blade P, the segment S2 on the leading edge 2 of the blade P. The heater mat is electrically powered by electrical power supply means M.

The heater mat could be disposed on the blade P in various ways.

A first technique consists in making the heater mat flat using free impregnated composite materials that have not yet been polymerized. To do this, the resistor element is initially draped and then folded in the manner described above on a bench. Thereafter, the resistor element is secured to the composite substrate of the heater mat by being covered in one or more plies of textile reinforcement.

Once this operation has been completed, the heater mat is shaped and then polymerized in independent tooling of the punch and die type. The heater mat and shielding assembly is then either stuck to the core of a blade P that has been polymerized elsewhere, or else it is integrated with the blade P while it is being molded, with bonding then taking place during polymerization of the blade P.

A second technique enables the manufacturing costs of the device to be reduced. After a heater mat has been built up flat using composite materials, the heater mat is shaped in a recess in a molded blade, i.e. at the front portion of the core of said blade, and is subsequently polymerized in the blade mold. Using this method, the molded blade acts as a mold core, thereby reducing manufacturing time and avoiding any need to invest in special tooling for molding the heater mat.

Naturally, the present invention can be varied in numerous ways as to its implementation. Although various embodiments are described above, it will readily be understood that it is not possible to identify all possible embodiments in exhaustive manner. It is naturally possible to envisage replacing any of the means described by equivalent means without going beyond the ambit of the present invention.

What is claimed is:

1. A heater mat for using the Joule effect to heat an aerodynamic surface of an aircraft, the mat being provided with a resistor element comprising at least two substantially parallel segments of electrically-conductive fibers disposed on said aerodynamic surface, said substantially parallel segments coming from a single strip of electrically-conductive fibers, and two adjacent substantially parallel segments being obtained by folding a portion of said single strip at least twice, wherein said resistor element comprises at least two superposed resistive layers, each resistive layer being made up of a single strip.

2. A heater mat according to claim 1, wherein said electrically-conductive fibers are of the mineral type.

3. A heater mat according to claim 2, wherein said electrically-conductive fibers comprise carbon.

4. A heater mat according to claim 1, wherein at least a portion of said single strip is of constant width.

5. A heater mat according to claim 1, wherein at least a portion of said single strip is of varying width.

6. A heater mat according to claim 1, wherein at least a portion of said single strip is of continuously varying width.

7. A heater mat according to claim 1, wherein at least two superposed and adjacent resistive layers are separated by a dielectric layer and are electrically powered in independent manner.

8. A heater mat according to claim 7, wherein said dielectric layer is made of a glass fabric impregnated with a thermosetting matrix.

9. A heater mat according to claim 1, wherein at least two superposed and adjacent resistive layers are electrically in contact with each other.

10. A heater mat according to claim 1, wherein said parallel segments of electrically-conductive fibers are disposed on the span of said aerodynamic surface parallel to its leading edge.

* * * * *